(12) United States Patent
Zeng et al.

(10) Patent No.: US 10,725,932 B2
(45) Date of Patent: Jul. 28, 2020

(54) OPTIMIZING HEADLESS VIRTUAL MACHINE MEMORY MANAGEMENT WITH GLOBAL TRANSLATION LOOKASIDE BUFFER SHOOTDOWN

(71) Applicant: QUALCOMM INCORPORATED, San Diego, CA (US)

(72) Inventors: Thomas Zeng, San Diego, CA (US); Samar Asbe, San Diego, CA (US); Adam Openshaw, San Diego, CA (US)

(73) Assignee: Qualcomm Incorporated, San Diego ( * ) Notice: Subject to any disclaimer, the term of this patent is extended or adjusted under 35 U.S.C. 154(b) by 0 days.

(21) Appl. No.: 16/204,965

(22) Filed: Nov. 29, 2018

(65) Prior Publication Data

US 2019/0163645 A1 May 30, 2019

Related U.S. Application Data

(60) Provisional application No. 62/592,353, filed on Nov. 29, 2017.

(51) Int. Cl.
*G06F 12/00* (2006.01)
*G06F 12/1027* (2016.01)
*G06F 9/455* (2018.01)

(52) U.S. Cl.
CPC ...... *G06F 12/1027* (2013.01); *G06F 9/45558* (2013.01); *G06F 2009/45583* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,287,124 B2 | 10/2007 | Cohen | |
| 9,390,014 B2 * | 7/2016 | Gschwind | G06F 3/0619 |
| 9,411,745 B2 | 8/2016 | Shen et al. | |
| 9,898,226 B2 | 2/2018 | Miller, Jr. et al. | |
| 9,916,257 B2 | 3/2018 | Sankaran et al. | |
| 2010/0332786 A1 * | 12/2010 | Grohoski | G06F 9/3851 |
| | | | 711/207 |
| 2017/0357575 A1 * | 12/2017 | Lee | G06F 12/0269 |
| 2018/0004675 A1 * | 1/2018 | Shanbhogue | G06F 12/1009 |
| 2018/0232320 A1 * | 8/2018 | Raval | G06F 12/1081 |
| 2018/0329829 A1 * | 11/2018 | Zmudzinski | G06F 12/1009 |

* cited by examiner

*Primary Examiner* — John A Lane
(74) *Attorney, Agent, or Firm* — Holland & Hart LLP (57) ABSTRACT

Systems, methods, and computer programs are disclosed for optimizing headless virtual memory management in a system on chip (SoC) with global translation lookaside buffer shootdown. The SoC comprises an application processor configured to execute a headful virtual machine and one or more SoC processing devices configured to execute a corresponding headless virtual machine. The method comprises issuing a virtual machine mapping command with a headless virtual machine having a first virtual machine identifier. In response to the virtual machine mapping command, a current value stored in a hardware register in the application processor is saved. The first virtual machine identifier associated with the headless virtual machine is loaded into the hardware register. A translation lookaside buffer (TLB) invalidate command is issued while the first virtual machine identifier is loaded in the hardware register. Upon completion of translation lookaside buffer synchronization, the current value is restored to the hardware register.

30 Claims, 6 Drawing Sheets

OPTIMIZING HEADLESS VIRTUAL MACHINE MEMORY MANAGEMENT WITH GLOBAL TRANSLATION LOOKASIDE BUFFER SHOOTDOWN

PRIORITY CLAIM AND RELATED APPLICATION STATEMENT

This application claims priority under 35 U.S.C. § 119(e) and is a non-provisional application of U.S. Provisional Patent Application Ser. No. 62/592,353, filed on Nov. 29, 2017, entitled, "OPTIMIZING HEADLESS VIRTUAL MACHINE MEMORY MANAGEMENT WITH GLOBAL TRANSLATION LOOKASIDE BUFFER SHOOTDOWN," the entire contents of which are hereby incorporated by reference.

DESCRIPTION OF HE RELATED ART

Portable computing devices (e.g., cellular telephones, smart phones, tablet computers, portable game consoles, wearable devices, and other battery-powered devices), Internet of things (IoT) devices (e.g., smart home appliances, automotive and other embedded systems), and other computing devices continue to offer an ever-expanding array of features and services, and provide users with unprecedented levels of access to information, resources, and communications. To keep pace with these service enhancements, such devices have become more powerful and more complex. Smart computing devices now commonly include a system on chip (SoC) comprising an application processor and one or more non-application SoC processing devices embedded on a single substrate. The application processor and the non-application SoC processing devices comprise memory clients that read data from and store data in a system memory.

The application processor and non-application SoC processing device(s) may be configured to perform processing operations with reference to virtual memory addresses. In the process of supporting various virtual memory maintenance or optimization operations (e.g., changing address mapping, page permissions, etc.), page table entries associated with the memory clients may need to be modified via a process referred to as global translation lookaside buffer (TLB) shootdown in which system-wide TLB entries are invalidated.

Existing solutions for providing global TLB shootdown have various disadvantages. In a conventional SoC solution, if a given CPU wishes to invalidate a TLB entry in the CPU's associated TLB, that CPU may broadcast a TLB invalidation instruction that specifies the virtual address (VA), an address space identifier (ASID) and the virtual machine identifier (VMID) of the page to be invalidated which contains the invalid TLB entry.

The distributed nature of the memory system is reflected in the fact that not only is this TLB entry invalidated in the local TLB, but by broadcast across the system interconnect, any relevant TLB entries in other CPUs in the system are also invalidated. However, in SoC systems employing both headful and headless virtual machines, existing distributed virtual memory (DVM)-based global TLB shootdown can only be performed on headful virtual machines. Virtual machines in which code is executed by an application processor are often referred to as "headful" or high-level operating system (HLOS) virtual machines. Virtual machines executed by non-application SoC processing devices, such as, but not limited to, digital signal processors (DSPs) and graphics processing units (GPUs) as explained in more detail below, are frequently referred to as "headless" virtual machines. Headless virtual machines are required to perform a much slower and more complex register-based TLB invalidation process.

For example, a conventional non-DVM, register-based solution may involve a multi-step process described in more detail below. Not only does this multi-step process slow down virtual memory management but it complicates clock and power management logic.

SUMMARY OF THE DISCLOSURE

Systems, methods, and computer programs are disclosed for optimizing headless virtual memory management in a system on chip (SoC) with global translation lookaside buffer shootdown. The SoC comprises an application processor configured to execute a headful virtual machine and one or more SoC processing devices configured to execute a headless virtual machine. The method comprises issuing a virtual machine mapping command with a headless virtual machine having a first virtual machine identifier.

In response to the virtual machine mapping command, a current value stored in a hardware register in the application processor is saved. The first virtual machine identifier associated with the headless virtual machine is loaded into the hardware register. A translation lookaside buffer (TLB) invalidate command is issued while the first virtual machine identifier is loaded in the hardware register. Upon completion of translation lookaside buffer synchronization, the current value is restored to the hardware register.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets (e.g., data from one component interacting with another component in a local system, distributed system, and/or across a network such as the Internet with other systems by way of the signal).

The term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

The term "task" may include a process, a thread, or any other unit of execution in a device.

The term "virtual memory" refers to the abstraction of the actual physical memory from the application or image that is referencing the memory. A translation or mapping may be used to convert a virtual memory address to a physical memory address. The mapping may be as simple as 1-to-1 (e.g., physical address equals virtual address), moderately complex (e.g., a physical address equals a constant offset from the virtual address), or the mapping may be complex (e.g., every 4 KB page mapped uniquely). The mapping may be static (e.g., performed once at startup), or the mapping may be dynamic (e.g., continuously evolving as memory is allocated and freed).

In this description, the terms "communication device," "wireless device," "wireless telephone", "wireless communication device," and "wireless handset" are used interchangeably. With the advent of third generation ("3G"), fourth generation ("4G"), and fifth generation ("5G") wireless technology, greater bandwidth availability has enabled more portable computing devices with a greater variety of wireless capabilities. Therefore, a portable computing device may include a smart phone, a cellular telephone, a navigation device, a game console, or a hand-held computer with a wireless connection or link.

Figure 1:
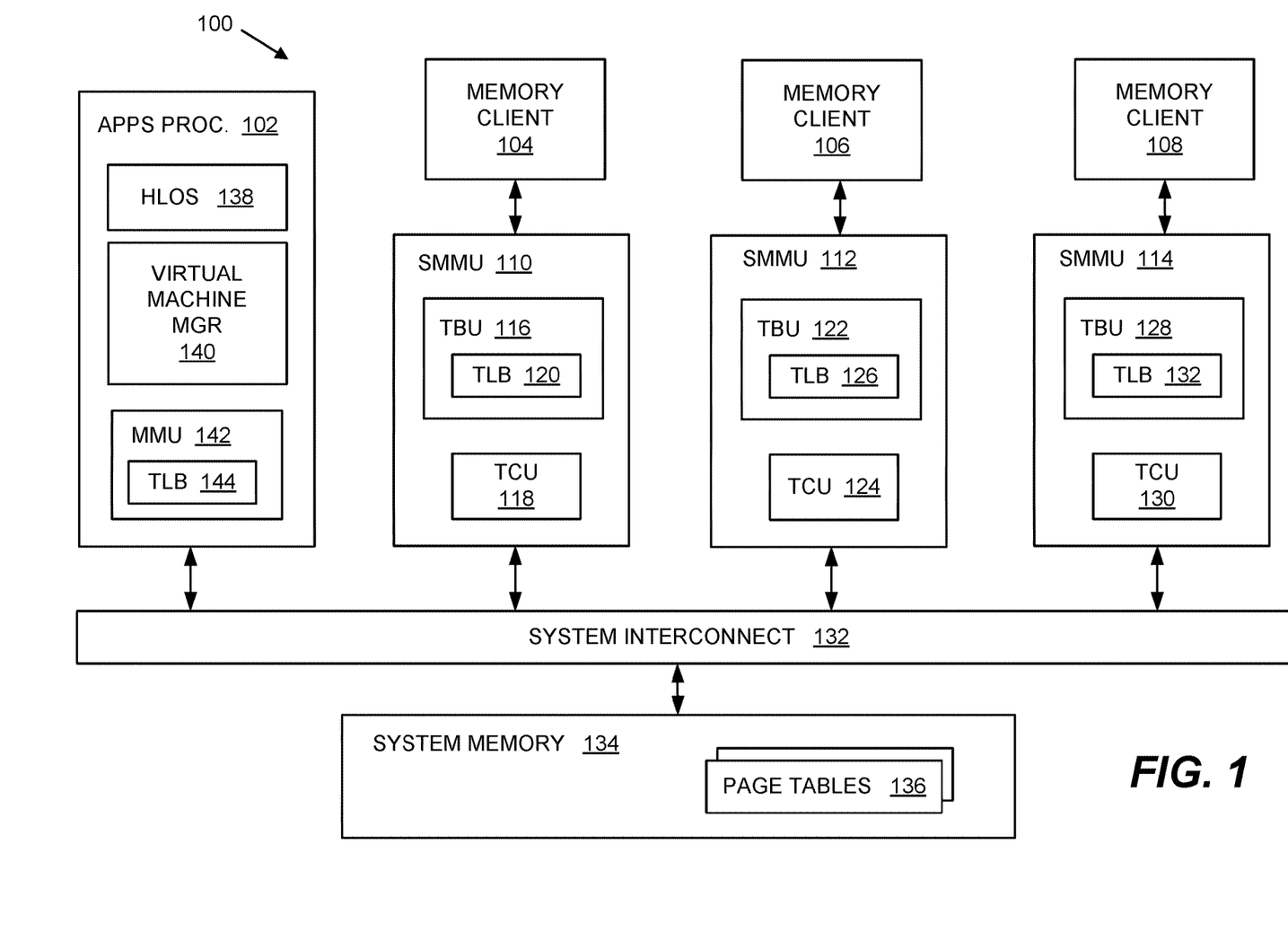
FIG. 1 is a block diagram of a system for optimizing headless virtual memory management in a system on chip (SoC) with global translation lookaside buffer shootdown.

FIG. 1 illustrates an embodiment of a system 100 for optimizing virtual memory management in a system on chip (SoC) with global translation lookaside buffer shootdown. The system 100 comprises a plurality of processing devices electrically coupled to a system memory 134 via a system interconnect 132. The system memory 134 may include a system cache (not shown) residing on the SoC. It should be appreciated that in certain embodiments the system memory 134 may comprise one or more dynamic random access memory (DRAM) modules electrically coupled to the SoC. System interconnect 132 may comprise one or more busses and associated logic for connecting the processing devices, memory management units, and other elements of the system 100.

As illustrated in FIG. 1, one of the SoC processing devices comprises an application processor 102. It should be appreciated that the application processor 102 comprises a specially-configured processor designed to support applications running in a mobile operating system environment. As known in the art, a mobile application processor comprises a self-contained operating environment that delivers the system capabilities for supporting a portable computing device's applications, including, for example, memory management, graphics processing, etc. As illustrated in FIG. 1, application processor 102 may execute a high-level operating system (HLOS) 138 and any applications software. An application processor 102 may comprise a single central processing unit (CPU), a single graphics processing unit (GPU), or a multi-core central processing unit (CPU) having one or more CPU(s), graphics processing unit(s) (GPU(s)), etc.

It should be further appreciated that application processor 102 may be independent from one or more additional processing devices residing on the SoC that may access system memory 134. In this regard, the independent SoC processing device(s) may be referred to as "non-application" processing device(s) or memory client(s) because they may be distinct from application processor 102. In the embodiment of FIG. 1, the SoC further comprises three memory clients 104, 106, and 108.

Memory clients 104, 106, and 108 may comprise any type of processing device, processor, digital signal processor (DSP), etc. Examples of non-application processing devices include, but are not limited to, a display processing unit, a video processing unit/graphics processing unit (GPU), a cryptographic engine, a general purpose direct memory access engine, etc.

Application processor 102 and non-application SoC processing device(s) (e.g., memory clients 104, 106, and 108) may be configured to perform processing operations with reference to virtual memory addresses. In this regard, application processor 102 comprises a memory management unit (MMU) 142 and each non-application SoC processing device may comprise (or may be electrically coupled to) a subsystem MMU (SMMU). Virtual machines in which code is executed by application processor 102 are referred to below as "headful" or MOS virtual machines. Virtual machines executed by non-application SoC processing devices (e.g., memory clients 102, 104, and 106) are referred to below as "headless" virtual machines.

In the embodiment of FIG. 1, memory clients 104, 106, and 108 may communicate with SMMUs 110, 112, and 114, respectively. MMU 142 and SMMU 110, 112, and 114 are configured to translate the virtual memory addresses used by the respective processing devices into physical memory addresses used by the system memory 134 with reference to page tables 136 that are stored in the system memory 134.

MMU 142 comprises logic (e.g., hardware, software, or a combination thereof) that performs address translation for application processor 102. Although for purposes of clarity MMU 142 is depicted in FIG. 1 as being included in application processor 142. MMU 142 may be externally coupled to application processor 102. SMMU 110, 112, and 114 provide address translation services for upstream device traffic in much the same way that the application processor MMU 142 translates addresses for processor memory accesses.

Each SMMU 110, 112, and 114 comprises a corresponding translation buffer unit (TBU) and a translation control unit (ICU), SMMU 110 comprises TBU 116 and TCU 118, SMMU 112 comprises TBU 122 and TCU 124. SMMU 114 comprises TBU 128 and TCU 130. As known in the art, TBUs 116, 122, and 128 store recent translations of virtual memory to physical memory in, for example, translation lookaside buffers (TLBs) 120, 126, and 132, respectively. If a virtual-to-physical address translation is not available in a TBU, then the corresponding TCU may perform a page table walk executed by a page table walker module. In this regard, the main functions of the TCU include address translation, memory protection, and attribute control. Address translation is a method by which an input address in a virtual address space is translated to an output address in a physical address space.

Translation information is stored in page tables 136 that the SMMU references to perform address translation. There are two main benefits of address translation. First, address translation allows memory clients 104, 106, and 108 to address a large physical address space. For example, a 32 bit processing device (i.e., a device capable of referencing $2^{32}$ address locations) can have its addresses translated such that memory clients 104, 106, and 108 may reference a larger address space, such as a 36 bit address space or a 40 bit address space. Second, address translation allows processing devices to have a contiguous view of buffers allocated in memory, despite the fact that memory buffers are typically fragmented, physically non-contiguous, and scattered across the physical memory space.

Page tables 136 contain information necessary to perform address translation for a range of input addresses. Although not shown in FIG. 1 for purposes of clarity, page tables 136 may include a plurality of tables comprising page table entries (PTE). It should be appreciated that the page tables 136 may include a set of sub-tables arranged in a multi-level "tree" structure. Each sub-table may be indexed with a sub-segment of the input address. Each sub-table may include translation table descriptors. There are three base types of descriptors: (1) an invalid descriptor, which contains no valid information; (2) table descriptors, which contain a base address to the next level sub-table and may contain translation information (such as access permission) that is relevant to all sub-sequent descriptors encountered during the walk; and (3) block descriptors, which contain a base output address that is used to compute the final output address and attributes/permissions relating to block descriptors.

The process of traversing page tables 136 to perform address translation is known as a "page table walk." A page table walk is accomplished by using a sub-segment of an input address to index into the translation sub-table, and finding the next address until a block descriptor is encountered. A page table walk comprises one or more "steps." Each "step" of a page table walk involves: (1) an access to a page table 136, which includes reading (and potentially updating) it; and (2) updating the translation state, which includes (but is not limited to) computing the next address to be referenced.

Each step depends on the results from the previous step of the walk. For the first step, the address of the first page table entry that is accessed is a function of the translation table base address and a portion of the input address to be translated. For each subsequent step, the address of the page table entry accessed is a function of the page table entry from the previous step and a portion of the input address. In this manner, the page table walk may comprise two stages. A first stage may determine the intermediate physical address. A second stage may involve resolving data access permissions at the end of which the physical address is determined. The method and system are implemented for headless virtual machine and hence all the references are about stage-2 translation only. However, the method and system are not restricted just to stage-2 translations.

As further illustrated in FIG. 1, applications processor 102 may comprise a virtual machine manager 140 configured to manage a plurality of virtual machines. Virtual machine manager 140 may be configured to provide a virtual machine (VM) based security model.

Figure 2:
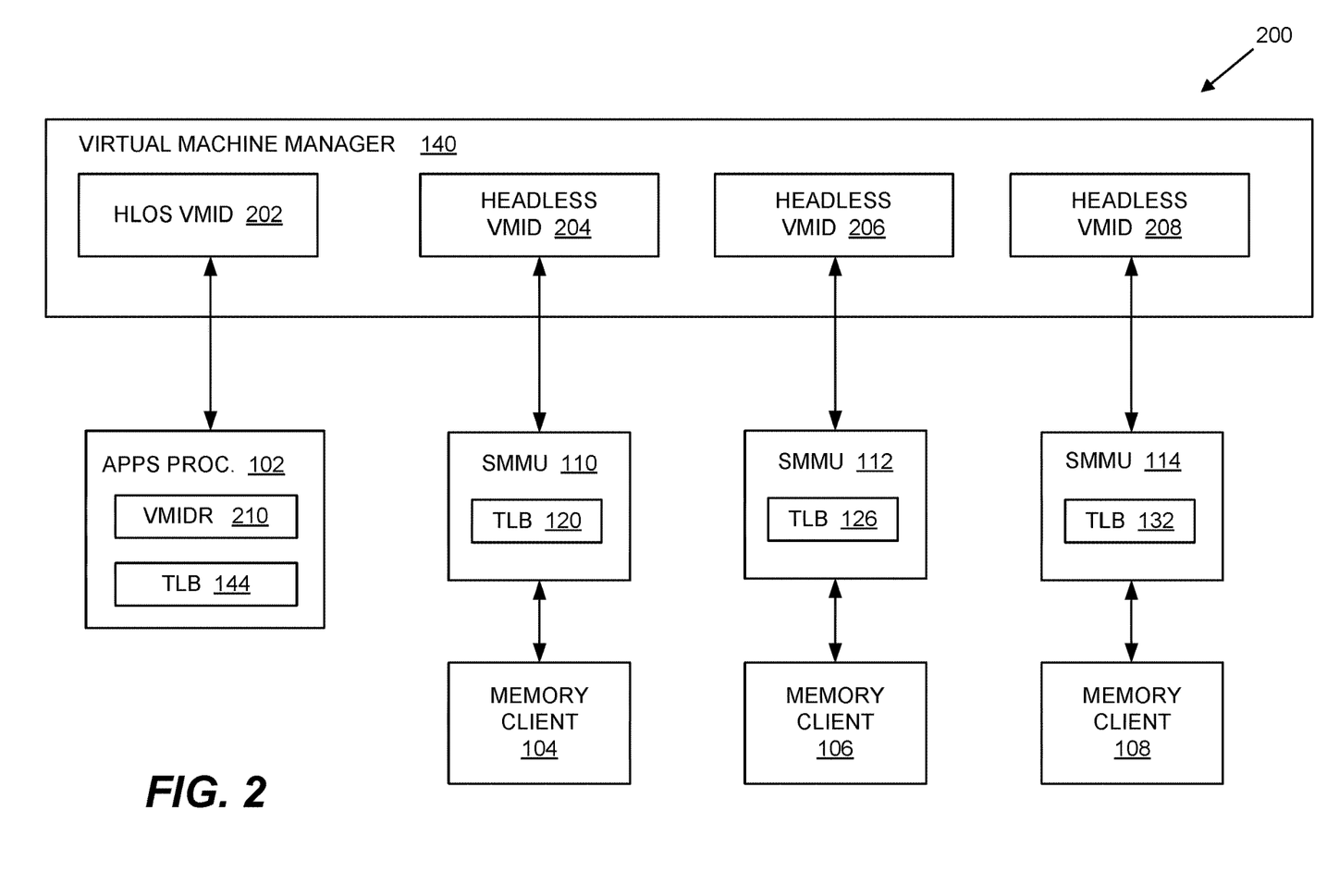
FIG. 2 illustrates an embodiment of a distributed virtual memory network managed by the virtual memory manager of FIG. 1.

Referring now to FIG. 2, this figure illustrates a distributed virtual memory (DVM) system comprising two different types of virtual machines: (1) headful virtual machines; and (2) headless virtual machines. Virtual machines in which code is executed by application processor 102 are referred to as "headful" or HLOS virtual machines. Virtual machines executed by non-application SoC processing devices (e.g., memory clients 102, 104, and 106) are referred to as "headless" virtual machines. In headless virtual machines, no code runs on application processor 102. Instead, the code runs only on the non-application SoC processing device.

The term "head" is used as an analogy for the application processor 102. Hence, if a virtual machine has a component running on application processor 102, it is considered a headful virtual machine. If a virtual machine is only running on non-application processors within an SoC, then it is considered to be a headless virtual machine. Examples of a headless virtual machine may include, though not limited to, an audio virtual machine that runs on an audio processing unit or a multimedia content protection virtual machine that runs on the display processing unit and video processing unit.

As mentioned above, in order to avoid the latency associated with the retrieval of a page table 136 from system memory 134, MMU 142 and SMMU 110, 112, and 114 may be provided with TLBs 144, 120, 126, and 132, respectively, which are configured to cache a set of the most recently used address translations. In general, the entries in a given TLB may be tagged with a virtual machine (VM) identifier (VMID), which identifies the virtual machine associated with that TLB entry. Referring to FIG. 2, application processor 102 may execute a headful or HLOS virtual machine having a headful or HLOS VMID 202.

Each of memory clients 104, 106, and 108 may execute a headless virtual machine having headless VMIDs 204, 206, and 208, respectively. In the process of supporting various virtual memory maintenance or optimization operations (e.g., changing address mapping, page permissions, etc.), a page table entry may need to be modified, which may involve a process referred to as TLB shootdown in which the virtual machine (VM)-wide TLB entries are invalidated.

Existing solutions for providing global TLB shootdown have various disadvantages. In a conventional SoC solution, if a given CPU wishes to invalidate a TLB entry in its associated TLB, that CPU may broadcast a TLB invalidation instruction that specifies the virtual address (VA), an address space identifier (ASID) and the virtual machine identifier (VMID) of the page to be invalidated. The distributed nature of the memory system is reflected in the fact that not only is this TLB entry invalidated in the local TLB, but by broadcast across the system interconnect, any relevant TLB entries in other CPUs in the system are also invalidated. However, in conventional SoC systems employing both headful and headless virtual machines, existing DVM-based global TLB shootdown can only be performed on headful virtual machines. Headless virtual machines are required to perform a much slower and more complex register-based TLB invalidation process.

For example, a conventional non-DVM, register-based solution involves the following steps: (1) the virtual machine manager initiates a SMMU power vote to the SMMU associated with the memory client executing the headless virtual machine; (2) the virtual machine manager initiates a SMMU clock vote to the SMMU; (3) the TBU clock associated with the memory client is turned on; (4) the virtual machine manager writes to a SMMU_TLBIVMID register; (5) the virtual machine manager writes to SMMU_SYNC; (6) the virtual machine manager polls for SMMU_SYNCSTATUS; (7) SMMU clock is removed; and (8) SMMU power is removed. Not only does this process slow down virtual memory management but it complicates clock and power management logic.

Figure 3:
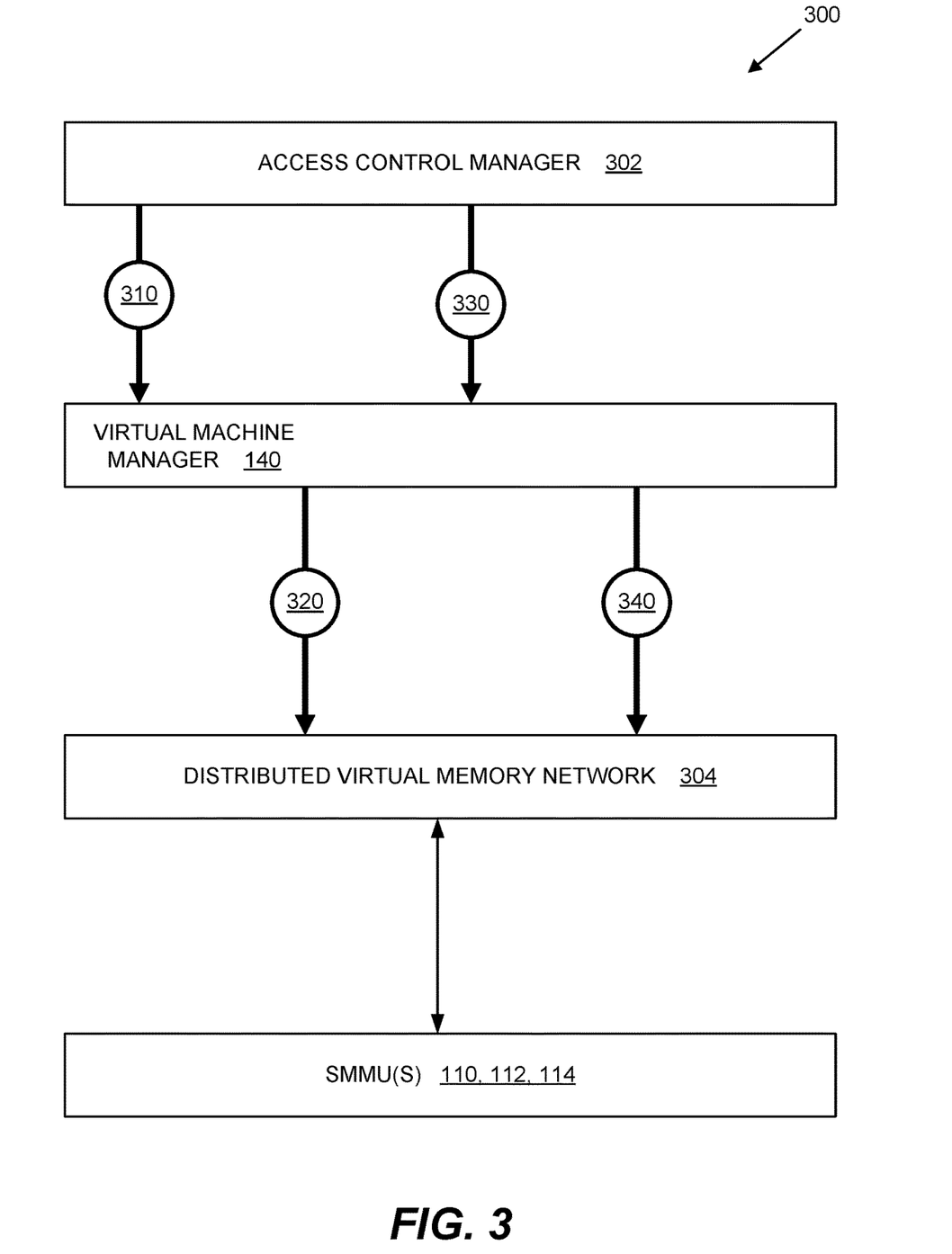
FIG. 3 is block/flow diagram illustrating an exemplary embodiment of method for optimizing headless virtual memory management in an SoC with global translation lookaside buffer shootdown.

FIG. 3 illustrates an embodiment of a method 300 for applying DVM-based global TLB shootdown to headless virtual machines. As illustrated in FIG. 3, the method 300 may be implemented via an access control manager 302, the virtual machine manager 140, the DVM network 304, and the SMMU hardware (e.g., SMMUs 110, 112, and 114). Access control manager 302 comprises a module that is part of a hypervisor and is responsible for enforcing SoC security access control policy. As understood by one of ordinary skill in the art, a hypervisor is computer software, firmware, or hardware (or any combination thereof) that creates and runs virtual machines.

Access control manager 302 is configured to determine which assets or memory regions within the SoC may be made accessible to different virtual machines running in the SoC. DVM network 304 comprises a channel which connects MMU 142 in the application processor 102 to the SMMU(s) 110, 112, and 114. The channel may be used to broadcast TLB maintenance operations from application processor 102 to SMMU(s) 110, 112, and 14 and get a response for completion of the issued TLB maintenance operation.

At step 310, the access control manager 302 may initiate a virtual machine mapping command for a headful virtual machine by specifying the headful or HLOS VMID 202. The virtual machine mapping command may comprise, for example, a VM commit function—VM_CommitMappings (ac_vm_HEADFULL)—which passes the HLOS VMID 202 to the virtual machine manager 140. In response to the virtual machine mapping command, at step 320, the virtual machine manager 140 may initiate a TLB invalidation instruction in the conventional manner, which may result in the TLB entry in the TLB 144, shown in FIG. 1, being invalidated, as well as broadcasting the TLB invalidation across time system interconnect 132 to any other headful virtual machines.

At step 330, the access control manager 302 may initiate another virtual machine mapping command that may be transmitted to one or more of the headless virtual machines by specifying one or more of the headless VMID 204, 206, and 208. The virtual machine mapping command may be issued to the DVM network 304. In response to the virtual machine mapping command, at step 340, the virtual machine manager 140 may be configured to temporarily obtain control of an application processor 102 for TLB invalidation of the one or more headless virtual machines. In an embodiment, the virtual machine manager 140 may "hijack" application processor 102 via an internal hardware register, such as, for example, a virtual machine identifier register (VMIDR) 210, shown in FIG. 2.

Figure 4A:
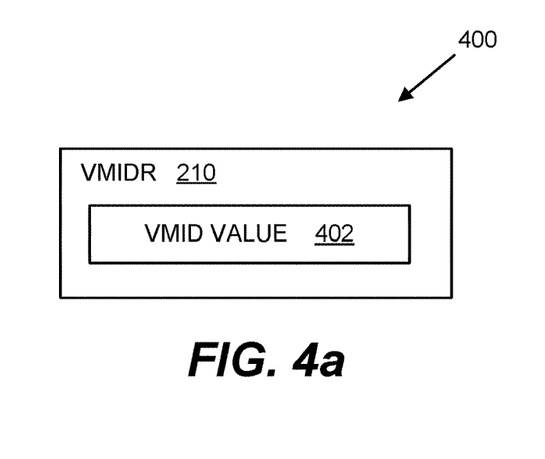
FIG. 4a illustrates an initial state of the VMID value stored in the VMIDR of FIG. 2.
Figure 4B:
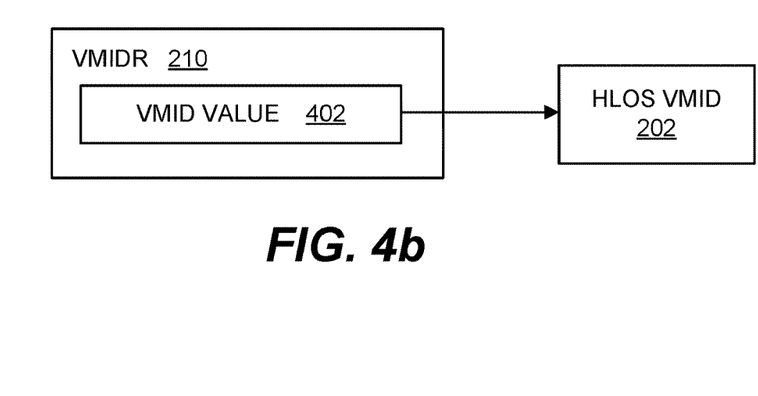
FIG. 4b illustrates a current VMID value being stored in a memory.
Figure 4C:
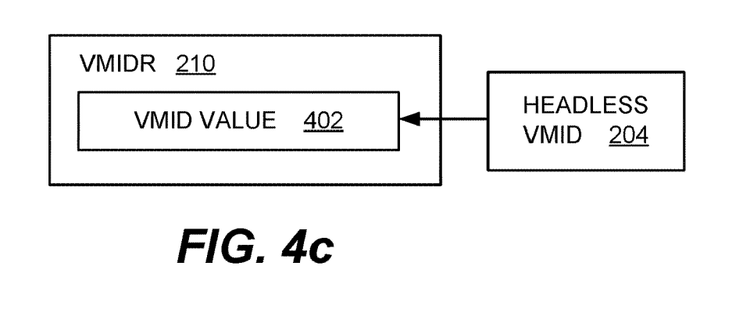
FIG. 4c illustrates a headless VMID being loaded into the VMIDR.
Figure 4D:
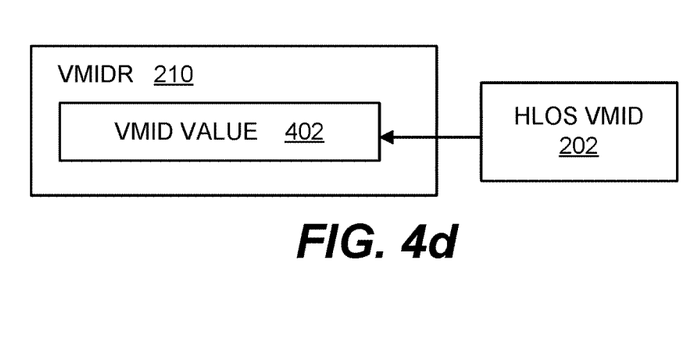
FIG. 4d illustrates the VMID value in the VMIDR being restored to the original stored value.

FIGS. 4a-4d illustrate an exemplary method for temporarily obtaining control of application processor 102 for the purpose of TLB invalidation of a headless virtual machine. FIG. 4a illustrates an initial state 400 of the VMID value 402 stored in VMIDR 210. In the initial state 400, the VMID value 402 may comprise the HLOS VMID 202 associated with the headful virtual machine being executed by application processor 102. In association with step 340 described above, as illustrated in FIG. 4b, the virtual machine manager 140 may store the current VMID value 402 (HLOS VMID 202) in a memory 134 (FIG. 1), and then load the headless VMID 204 into the VMIDR 210 (FIG. 4c). It should be appreciated that loading the headless VMID 204 into the VMIDR 210 ensures that the DVM network 304 will honor this value as the target of TLB invalidation. Further in association with step 340, the virtual machine manager 140 may request that the DVM network hardware issue a TLB invalidate command using the headless VMID 204. Upon completion of the TLB synchronization process, the virtual machine manager 140 may restore the HLOS VMID 202 to the VMID value 402 in the VMIDR 210, as illustrates in FIG. 4d.

Figure 5:
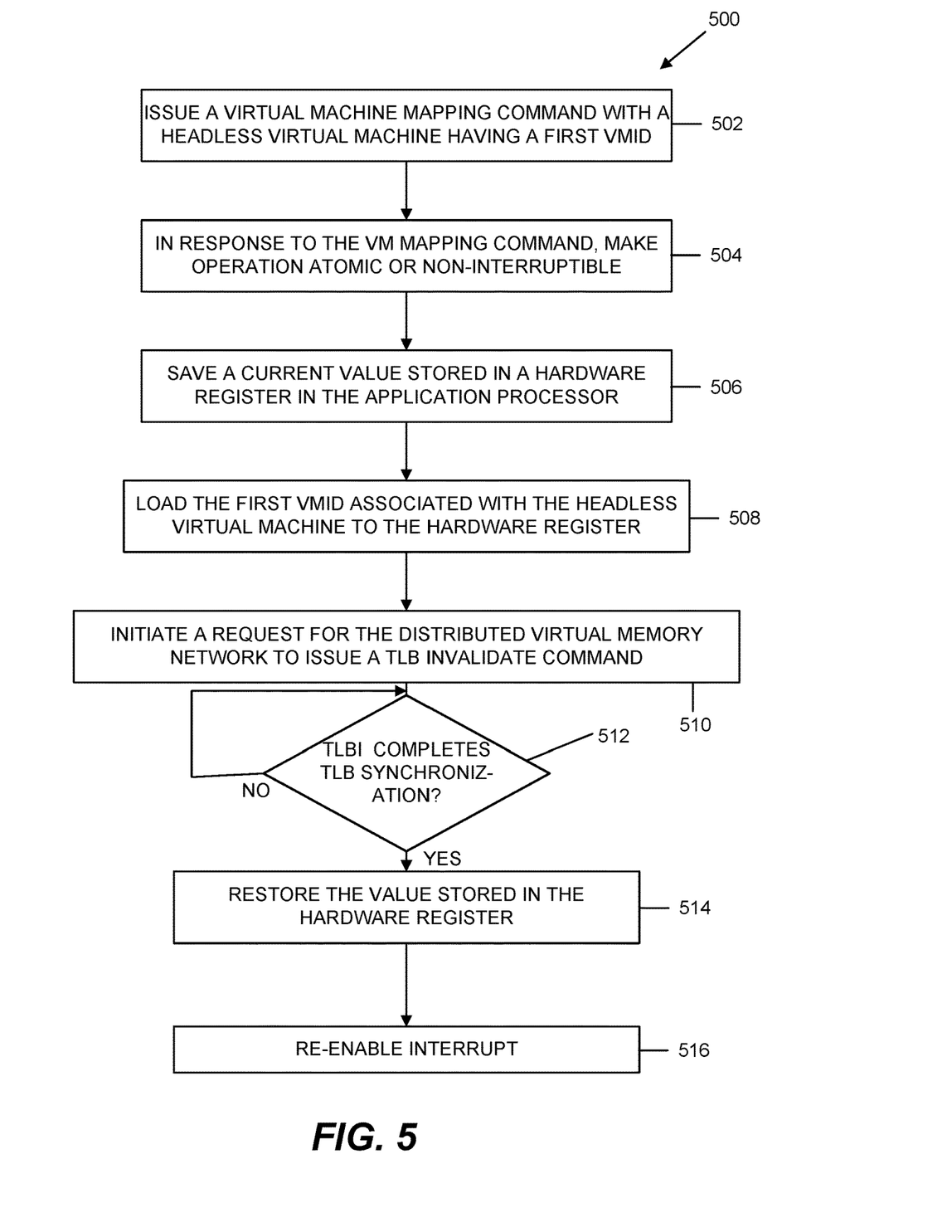
FIG. 5 is a flowchart illustrating an embodiment of a method for optimizing headless virtual memory management in the SoC of FIG. 1 with global translation lookaside buffer shootdown.

FIG. 5 illustrates another embodiment of a method 500 for applying DVM-based global TLB shootdown to headless virtual machines. At block 502, a virtual machine mapping command may be issued with a headless virtual machine having a first VMID. As mentioned above, the VM mapping command may pass the first VMID identifying the headless virtual machine. At block 504, in response to the VM mapping command, an interrupt on the application processor 102 may be disabled to make the mapping operation atomic, and hence non-interruptible.

Figure 6:
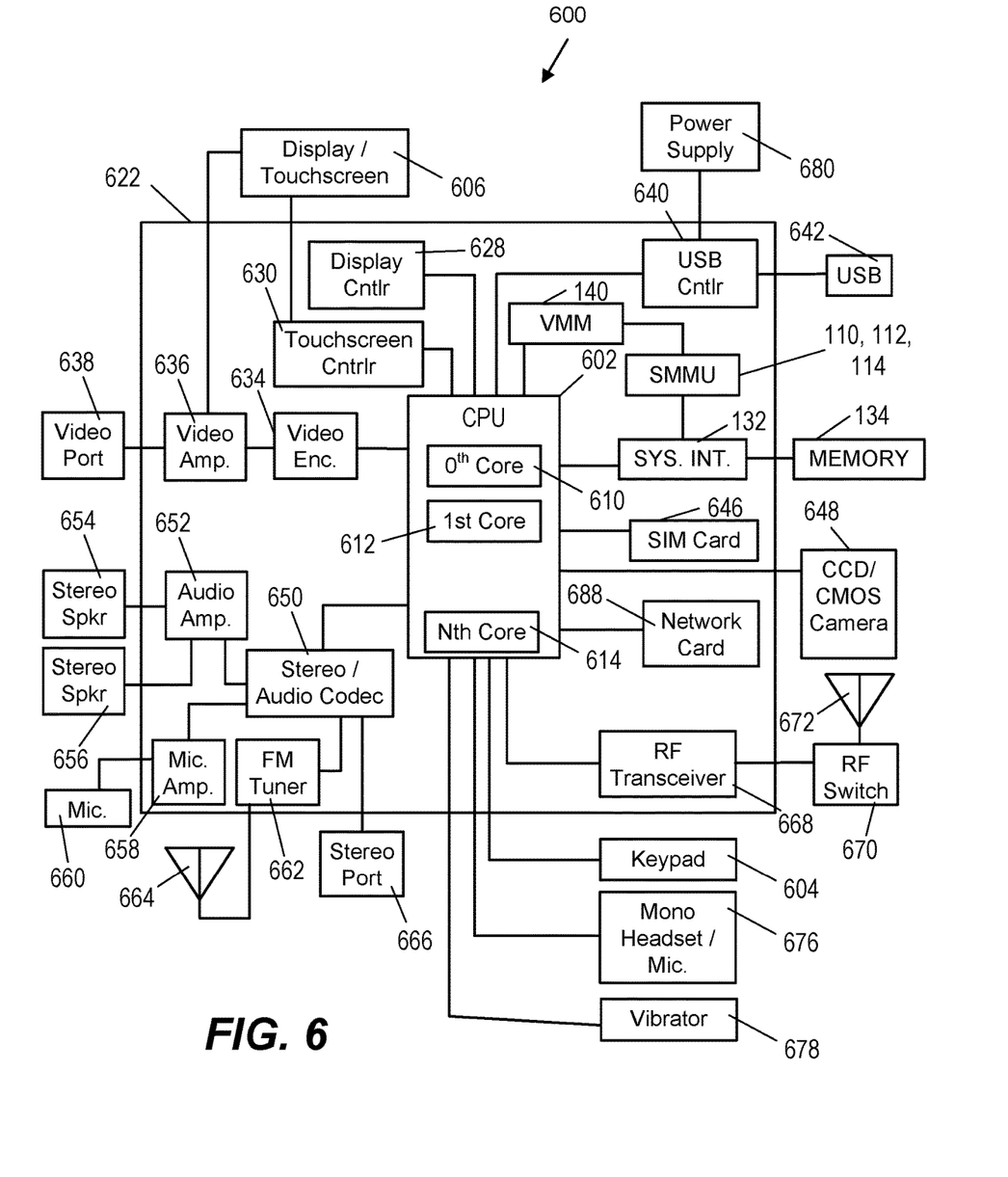
FIG. 6 is a block diagram of an embodiment of a portable computing device that may incorporate the systems and methods for optimizing headless virtual memory management in the SoC of FIG. 1 with global translation lookaside buffer shootdown.

At block 506, a current value stored in a hardware register (e.g., VMIDR 210) may be stored in a memory. As mentioned above, the current value may comprise an HLOS VMID 202. At block 508, the first VMID associated with the headless virtual machine (e.g., headless VMID 204) may be loaded to the hardware register in application processor 102. At block 510, a request may be initiated for the distributed virtual memory network 304 to issue a TLB invalidate command. It should be appreciated that the TLB invalidate command may specify the headless VMID 204 as the target of TLB invalidation based on the VMID value 402. At decision block 512, when TLB synchronization has completed, the VMID value 402 may be restored to the temporarily saved value from block 506 (block 514). After restoring the VMID value 402, at block 516, the interrupt on the application processor 102 may be re-enabled. 100511 FIG. 6 illustrates an embodiment in which one or more components of the system 100 are incorporated in an exemplary portable computing device (PCD) 600. PCD 600 may comprise a smart phone, a tablet computer, or a wearable device (e.g., a smart watch, a fitness device, etc.).

It will be readily appreciated that certain components of the system 100 are included on the SoC 622 (e.g., system interconnect 132, application processor 102, SMMUs 110, 112, and 114) while other components (e.g., the system memory 134) are external components coupled to the SoC 622. The SoC 622 may include a multicore CPU 602. The multicore CPU 602 may include a zeroth core 610, a first core 612, and an Nth core 614. One of the cores may comprise the application processor 102 with one or more of the others comprising a graphics processing unit (GPU), etc.

A display controller 628 and a touch screen controller 630 may be coupled to the CPU 602. In turn, the touch screen display 607 external to the on-chip system 622 may be coupled to the display controller 628 and the touch screen controller 630.

FIG. 6 further shows that a video encoder 634, e.g., a phase alternating line (PAL) encoder, a sequential color a memoire (SECAM) encoder, or a national television system (s) committee (NTSC) encoder, is coupled to the multicore CPU 602. Further, a video amplifier 636 is coupled to the video encoder 634 and the touch screen display 606. Also, a video port 638 is coupled to the video amplifier 636. As shown in FIG. 6, a universal serial bus (USB) controller 640 is coupled to the multicore CPU 602. Also, a USB port 642 is coupled to the USB controller 640. A subscriber identity module (SIM) card 646 may also be coupled to the multicore CPU 602.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 622. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

As depicted in FIG. 6, the touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 622.

Alternative embodiments will become apparent to one of ordinary skill in the art to which the invention pertains without departing from its spirit and scope. The embodiments described above may be implemented in a hypervisor for headless virtual machines. However, it should be readily appreciated to one of ordinary skill in the art that the systems and methods described above in connection with FIGS. 1-5 may be more generally applied to headless "processes" rather than just a headless virtual machine.

Specifically, suppose a headless "process" is created on system 100. For example, there may be a general purpose processing device available on the SoC, and the HLOS may desire to create a process on a non-application processor but the process does not currently exist on the application processor 102.

The general purpose processing device may be doing work on behalf of the HLOS VM and, therefore, may be part of the HLOS VM (i.e., it would have same VMID). However, the HLOS may create process separation based on address space identifier (ASID) instead of VMID for the processes that are only running on this general purpose processing device.

It should be readily appreciated that the HLOS kernel may apply the same method but instead of the hypervisor (or virtual machine manager 140) hijacking/taking-control of the application processor 102, the HLOS kernel may hijack/take-control of the general purposed processing device and update the ASID register to "emulate" that the process is running on the application processor 102 as opposed to the general purpose processing device.

It should be appreciated that one or more of the method steps described herein may be stored in the memory as computer program instructions. These instructions may be executed by any suitable processor in combination or in concert with the corresponding components described in the figures to perform the methods described herein. Certain steps in the processes or process flows described in this specification naturally precede others for the invention to function as described.

However, the disclosure is not limited to the order of the steps or blocks described if such order or sequence does not alter the functionality. That is, it is recognized that some steps or blocks may performed before, after, or parallel (substantially simultaneously with) other steps or blocks. In some instances, certain steps or blocks may be omitted or not performed without departing from the invention. Further, words such as "thereafter", "then", "next", etc. are not intended to limit the order of the steps. Additionally, one of ordinary skill in programming is able to write computer code or identify appropriate hardware and/or circuits to implement the disclosed systems and methods without difficulty based on the flow charts and associated description in this specification, for example.

Therefore, disclosure of a particular set of program code instructions or detailed hardware devices is not considered necessary for an adequate understanding of how to make and use the disclosed systems and methods. The functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Therefore, although selected aspects have been illustrated and described in detail, it will be understood that various substitutions and alterations may be made therein without departing from the spirit and scope of the present invention, as defined by the following claims.

What is claimed is:

1. A method for virtual memory management in a system on chip (SoC) comprising an application processor executing a headful virtual machine and one or more SoC processing devices executing a headless virtual machine, the method comprising:
   issuing a virtual machine mapping command with the headless virtual machine having a first virtual machine identifier;
   in response to the issuance of the virtual machine mapping command, saving a current value stored in a hardware register in the application processor;
   loading the first virtual machine identifier associated with the headless virtual machine into the hardware register;
   issuing a translation lookaside buffer (TLB) invalidate command while the first virtual machine identifier is loaded in the hardware register; and
   restoring the current value to the value stored in the hardware register.

2. The method of claim 1, wherein issuing the TLB invalidate command comprises invalidating a first TLB corresponding to the application processor.

3. The method of claim 2, wherein issuing the TLB invalidate command comprises broadcasting a further TLB invalidate command to one or more additional TLBs corresponding to one or more headless virtual machines.

4. The method of claim 1, wherein the hardware register in the application processor comprises a virtual machine identifier register.

5. The method of claim 1, wherein the virtual machine mapping command is non-interruptible.

6. The method of claim 1, wherein interrupts on the application processor are disabled after the issuance of the virtual machine mapping command.

7. The method of claim 1, wherein the application processor comprises a memory management unit (MMU).

8. The method of claim 7, wherein each SoC processing device of the one or more SoC processing devices comprises a system memory management unit (SMMU).

9. The method of claim 8, wherein the application processor and each SoC processing device of the one or more SoC processing devices further comprises a TLB.

10. The method of claim 1, wherein each SoC processing device of the one or more SoC processing devices comprises at least one of a display processing unit, a video processing unit, a cryptographic engine, and a general purpose direct memory access engine.

11. A system on chip comprising:
    an application processor configured to execute a headful virtual machine;
    one or more processing devices configured to execute a headless virtual machine; and
    a virtual machine manager configured to:
       receive a virtual machine mapping command with the headless virtual machine having a first virtual machine identifier;
       in response to the receipt of the virtual machine mapping command, save a current value stored in a hardware register in the application processor;
       load the first virtual machine identifier associated with the headless virtual machine into the hardware register;
       initiate a translation lookaside buffer (TLB) invalidate command while the first virtual machine identifier is loaded in the hardware register; and
       restore the current value to the value stored in the hardware register.

12. The system of claim 11, wherein initiating the TLB invalidate command comprises invalidating a first TLB corresponding to the application processor.

13. The system of claim 12, wherein initiating the TLB invalidate command comprises broadcasting a further TLB invalidate command to one or more additional TLBs corresponding to one or more headless virtual machines.

14. The system of claim 11, wherein the hardware register in the application processor comprises a virtual machine identifier register.

15. The system of claim 11, wherein the virtual machine mapping command is non-interruptible.

16. The system of claim 11, wherein interrupts on the application processor are disabled after the receipt of the virtual machine mapping command.

17. The system of claim 11, wherein the application processor comprises a memory management unit (MMU).

18. The system of claim 17, wherein each of the one or more processing devices comprises a system memory management unit (SMMU).

19. The system of claim 18, wherein the application processor and each of the one or more processing devices further comprises a TLB.

20. The system of claim 11, wherein each of the one or more processing devices comprises at least one of a display processing unit, a video processing unit, a cryptographic engine, and a general purpose direct memory access engine.

21. A system on chip comprising:
    an application processor configured to execute a headful virtual machine;

one or more processing devices configured to execute a headless virtual machine; and a virtual machine manager comprising:

means for receiving a virtual machine mapping command with the headless virtual machine having a first virtual machine identifier;

means for saving a current value stored in a hardware register in the application processor in response to the receipt of the virtual machine mapping command;

means for loading the first virtual machine identifier associated with the headless virtual machine into the hardware register;

means for initiating a translation lookaside buffer (TLB) invalidate command while the first virtual machine identifier is loaded in the hardware register; and  means for restoring the current value to the value stored in the hardware register.

22. The system of claim 21, wherein the means for initiating the TLB invalidate command comprises means for invalidating a first TLB corresponding to the application processor.

23. The system of claim 22, wherein the means for initiating the TLB invalidate command comprises means for broadcasting a further TLB invalidate command to one or more additional TLBs corresponding to one or more headless virtual machines.

24. The system of claim 21, wherein the hardware register in the application processor comprises a virtual machine identifier register.

25. The system of claim 21, wherein the virtual machine mapping command is non-interruptible.

26. A computer program product comprising a non-transitory computer-readable medium having a computer readable program code embodied therein, said computer readable program code adapted to be executed to implement a method for optimizing headless virtual memory management in a system on chip (SoC), said method comprising:

issuing a virtual machine mapping command with a headless virtual machine having a first virtual machine identifier;

in response to the issuance of the virtual machine mapping command, saving a current value stored in a hardware register in the application processor;

loading the first virtual machine identifier associated with the headless virtual machine into the hardware register;

issuing a translation lookaside buffer (TLB) invalidate command while the first virtual machine identifier is loaded in the hardware register; and  restoring the current value to the value stored in the hardware register.

27. The computer program product of claim 26, wherein issuing the TLB invalidate command comprises invalidating a first TLB corresponding to the application processor.

28. The computer program product of claim 27, wherein issuing the TLB invalidate command comprises broadcasting a further TLB invalidate command to one or more additional TLBs corresponding to one or more headless virtual machines.

29. The computer program product of claim 26, wherein the hardware register in the application processor comprises a virtual machine identifier register.

30. The computer program product of claim 26, wherein the virtual machine mapping command is non-interruptible.

\* \* \* \* \*